United States Patent
Ouyang et al.

(10) Patent No.: US 7,460,649 B2
(45) Date of Patent: Dec. 2, 2008

(54) METHOD AND APPARATUS FOR SINGLE END LOOP TESTING FOR DSL PROVISIONING AND MAINTENANCE

(75) Inventors: Feng Ouyang, Holmdel, NJ (US); Patrick Duvaut, Tinton Falls, NJ (US); Ming Gu, Eatontown, NJ (US)

(73) Assignee: Conexant Systems, Inc., Newport Beach, CA (US)

( * ) Notice: Subject to any disclaimer, the term of this patent is extended or adjusted under 35 U.S.C. 154(b) by 918 days.

(21) Appl. No.: 11/035,422

(22) Filed: Jan. 14, 2005

(65) Prior Publication Data

US 2005/0163287 A1 Jul. 28, 2005

Related U.S. Application Data

(60) Provisional application No. 60/536,255, filed on Jan. 14, 2004.

(51) Int. Cl.
*H04M 1/24* (2006.01)
*H04M 3/08* (2006.01)
*H04M 3/22* (2006.01)

(52) U.S. Cl. .................... 379/1.04; 379/1.03; 379/29.01

(58) Field of Classification Search ................ 379/1.01, 379/1.03, 1.04, 22, 22.01, 22.02, 22.03, 23, 379/24, 27.03, 27.08, 28, 29.01, 30, 406.01, 379/406.06, 406.08
See application file for complete search history.

(56) References Cited

U.S. PATENT DOCUMENTS

| | | | |
|---|---|---|---|
| 4,105,995 A | 8/1978 | Bothof | |
| 4,870,675 A | 9/1989 | Fuller et al. | |
| 5,881,130 A | 3/1999 | Zhang | |
| 6,177,801 B1 | 1/2001 | Chong | |
| 6,266,395 B1 | 7/2001 | Liu et al. | |
| 6,538,451 B1 | 3/2003 | Galli et al. | |
| 6,606,372 B2 | 8/2003 | Yi et al. | |
| 6,668,041 B2 | 12/2003 | Kamali et al. | |
| 6,819,744 B1 | 11/2004 | Banwell et al. | |

(Continued)

OTHER PUBLICATIONS

Galli, Stefano et al.; "Loop Makeup Identification Via Single Ended Testing: Beyond Mere Loop Qualification" *IEEE Journal on Selected Areas in Communications*, vol. 20, No. 5, Jun. 2002, pp. 923-935.

(Continued)

*Primary Examiner*—Quoc D Tran
(74) *Attorney, Agent, or Firm*—Thomas, Kayden, Horstemeyer & Risley, LLP

(57) ABSTRACT

A method and apparatus for single end loop testing for DSL provisioning and maintenance provides testing of the DSL loop using digital techniques including frequency compensation, matched filtering and median filtering, to remove strong background and enhance desired signal for peak detection. The SELT system allows DSL providers to extract loop information from reflective measurements at the central office (CO) so as to determine loop capability of supporting different DSL services. The method and apparatus acquires the desired signal (the far-end echo) which is submerged in the correlated background noise (the near-end echo) by providing a process for detecting loop length and termination types with high accuracy for loops up to 12 kft for 24 AWG and up to 9 kft for 26 AWG by exploiting several digital signal processing techniques including frequency.

25 Claims, 14 Drawing Sheets

U.S. PATENT DOCUMENTS

| | | |
|---|---|---|
| 6,842,012 B2 | 1/2005 | Belge et al. |
| 6,865,221 B2 | 3/2005 | Belge |
| 2002/0146095 A1* | 10/2002 | Peoples .................. 379/27.03 |
| 2004/0062361 A1* | 4/2004 | Kamali et al. .............. 379/1.04 |

OTHER PUBLICATIONS

Melsa, Peter J.W. et al.; "Texas Instruments: Single-Ended Loop Testing (SELT) Expectations and Realities" *SPAY011A*, Mar. 2003, White paper, pp. 1-18.

* cited by examiner

METHOD AND APPARATUS FOR SINGLE END LOOP TESTING FOR DSL PROVISIONING AND MAINTENANCE

CROSS-REFERENCE TO RELATED APPLICATIONS

The present application claims priority to U.S. Provisional Patent Application No. 60/536,255 entitled "System And Method For Single End Loop Testing For DSL Provisioning And Maintenance" filed Jan. 14, 2004, the entirety of which is incorporated by reference herein.

FIELD OF THE INVENTION

The present invention relates generally to electronic communication systems and in particular to systems and methods for extracting transmission environment (i.e., "loop") information, such as loop length and loop termination, for provisioning and maintaining digital subscriber line (DSL) loops.

BACKGROUND OF THE INVENTION

High-bandwidth technologies which are prevalent nowadays use the existing copper wire infrastructure deployed for plain old telephone systems (POTS) communication. With the advent of the Internet and other high-bandwidth electronic communication networks and systems and consumer demand increasing for information, such as interactive gaming and electronic entertainment like video on-demand, there has been a substantial need for reliable and affordable high bandwidth media for facilitating data transmissions between service providers and their customers. In relation to this need existing copper wire telephone systems infrastructure is utilized for delivering broadband services.

One such broadband technology is Digital Subscriber Line (DSL), which comes in multiple variations such as ADSL, HDSL, IDSL, SDSL, RADSL and VDSL (collectively "xDSL"). Asymmetric digital subscriber line (ADSL) provides a higher data rate downstream (i.e., to the customer) than upstream (i.e., to the service provider).

For service providers to effectively provision new customers in a less-costly manner, information about existing lines must be acquired prior to provisioning service. One critical task prerequisite to provisioning of xDSL services is loop length determination, which must be done to qualify the loop for DSL service. Loop link determination also qualifies the types of service that may be provisioned for a specific customer. In addition, the presence of load coils (inserted at specific intervals along the loop to enhance and restore call quality), bridge taps, (un-terminated cables on a communications line within the local loops, for tapping into a line) and other line characteristics affect the loop's ability to support DSL and must be considered when provisioning DSL service. Other equipment installed on subscriber loops may also render the loop unsuitable for the provision of DSL service.

In DSL applications, it is useful to be able to determine the achievable rate given actual line conditions of any given loop. This facilitates the provisioning and maintaining of services, such as DSL services. One thing that makes this task difficult is that measurements of the loop characteristics must be taken with access to only one end of the loop, typically the Central Office (CO). Such testing and provisioning is referred to as single end loop testing or single end line testing (SELT). Achievable data rate can be computed from the loop attenuation and the noise present. Noise can be measured directly. Loop attenuation can be computed if the loop length and composition are known.

In practical applications, it is desirable to combine a DSL modem with the SELT measurement device. They share the same transmit and receiver circuitry, as well as the digital processing unit. While the benefit in cost and ease of use is obvious, such arrangement brings a major complication in the design of SELT measurement method, as explained below.

In a SELT measurement, the received signal contains two components: the far-end echo (FE) and the near-end echo (NE). FE contains information on the loop termination at the far end, and the loop length. NE is mainly determined by the loop interfacing circuitry of the measuring device, and is not necessary when determining loop length in SELT measurement. However, because of the loop attenuation, FE signal is much weaker than NE. Therefore, it is necessary to isolate contribution from the FE signal, in order to conduct accurate SELT measurements. In a DSL modem, FE and NE components overlap in space and time. The ability to separate the individual FE and NE components and artifacts and residue is a major challenge in successful SELT measurements.

Testing methods and apparatuses that enable the determination of the physical and electrical characteristics of subscriber loops to be determined is all well known. Such methods and apparatuses are taught, for example, in U.S. Pat. No. 4,105,995 to Bothof et al.; U.S. Pat. No. 4,870,675 to Fuller et al.; and, U.S. Pat. No. 5,881,130 to Zhang. Single-ended qualification of customers for an xDSL service is disclosed by U.S. Pat. No. 6,266,395 to Liu et al. Traditionally, service providers in public switched telephone networks (PSTN) dispatch a technician to a customer premises who has expressed an interest in xDSL service. The technician coordinates testing with another technician at the service provider's Central Office (CO). This labor intensive process increases operating overhead and delays service provisioning. For comprehensive testing, full broadband test access is required.

Single End Loop Testing (SELT) may be used to extract information about the transmission environment, or loop, in a DSL system from reflective measurements. Extracted information may include characteristics or effects introduced by the transmission medium (e.g., the wireline), the noise environment in which the transmission medium operates, characteristics or effects introduced by DSL devices on the transmission medium, etc. The information about the transformation environment may include, for example, loop length, loop termination type, and the like. For instance, SELT may involve injecting signals into a loop under test at a central office (CO) to determine the loop capability to support different kinds of DSL services. Typically, only the CO is involved in loop testing and SELT is used to extract reflected signal information (often referred to as far-end echo) from the measurements. Near-end Echo, even at the tail of the near-end echo, is much stronger than the far-end echo causing the latter to be completely obscured in the correlated background noise. Much effort has been made to tackle the SELT problem and standardization by the ITU under project G.selt is currently underway. So far ITU contributions have focused on the calibration process, which treats the signal path between the transmitter, the receiver, and the loop as a three port linear time invariant (LTI) network. The process computes the input impedance via a one port scattering parameter.

Therefore, a need exists for effectively provisioning DSL services using single-end line testing that enables robust and accurate measurement of loop length and loop termination types.

SUMMARY OF THE INVENTION

Certain aspects commensurate in scope with various embodiments of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Traditionally, SELT is conducted with a time domain reflectometer (TDR). A TDR injects a very short pulse or a sharp raising edge in current into the loop, and measures the loop response in voltage. The interface circuitry is direct and simple, with near-instant response. This way, the near-end echo (NE) and far-end echo (FE) are separated in time domain. FE can be isolated by setting a time window.

If SELT measurement is to be combined with a DSL modem, the loop interface circuitry is necessarily more complex, inducing longer response time in NE. A typical DSL modem interface circuitry includes analog filters, back-matching circuit, a hybrid block, and a couple transformer. Therefore, NE and FE overlap in time.

One way to separate FE from NE is by predicting NE based on calibration. Such method is the base of the current SELT proposals in ITU. According to these proposals, the interface circuitry is modeled as a linear network with three parameters. The parameters are determined by three measurements, when the actual loop is replaced by three known loads. While theoretically sound, such method has some application problems. First, the precision required is very high, because of the great difference in intensity between FE and NE signals. On the other hand, the computations involved in calibration process can be numerically sensitive to measurement and computation precision limits. Second, the calibration process requires extra components, and thus additional costs, to the hardware platform.

The proposed method achieves separating between NE and FE by addressing different characteristics of the two signals. The NE is modeled qualitatively, instead of quantitatively. This way, it is simple and robust in application.

In one embodiment, the invention includes the following. Band-pass Tx filter is used to reduce near-end echo. Suppressing high-frequency transmit signal reduces NE while FE is unaffected, because loop attenuation at high frequencies is very high. Suppressing low-frequency transmit reduces NE spread in time domain, which is caused by responses of the transformers and other components at very low frequencies. Response: cross correlation between Tx and Rx. Time-continuous signal is transmitted, and the time-dependent echo response is measured from the correlation. Comparing to short pulses used by TDR, this method increases the average signal power without increasing peak signal levels, and thus achieves better signal to noise ratio. Matched response: cross-correlation between response and far-echo template. By such cross-correlation (equivalent to match filtering), FE is enhanced relative to NE. Scaled echo: matched response multiplies with a time-dependent gain, to compensate for loop attenuation. Background: Scaled echo passing median-filter. The median-filter output matches smooth background, while excluding peaks. This provides a simple way to model the NE. Far end echo: scaled echo subtracting background. The remaining peaks represent the FE. Loop length is determined by the positions of the peaks, with a relatively simple decision tree, taking into account the positions and magnitudes of the positive and negative peaks.

The present invention provides, among other things, a method of calculating loop length from the measured echo response.

In another embodiment, the invention provides a method for single-ended line testing (SELT) to provision xDSL service. The method includes generating an analog test signal derived from a time-continuous signal and transmitting the analog test signal through a loop to be tested and receiving a time-dependent echo response signal. The method includes applying band-pass filtering to reduce the near-end echo in time-domain and cross-correlating the transmitted analog test signal and the received echo response signal, to obtain an echo response function. The method includes applying bump compensation filtering to the echo response function and match filtering the echo response signal function with a far-end echo template. The method includes time-dependent scaling the matched echo response to compensate for loop attenuation, median filtering the scaled echo response to remove background noise and enhance peaks for detection; and determining a length of the loop based at least in past by the position of the peaks.

In accordance with another feature of an embodiment of the invention, there is provided a method for determining loop length in provisioning xDSL service. The method includes: acquiring far-end echo peaks by correlating an echo response with a far-end echo peak template; comparing at least two of positive peak positions, positive peak heights, negative peak positions, and negative peak heights; comparing a positive peak position with a range of times; comparing a positive peak height with a negative peak height; comparing a negative peak position with a positive peak position; and determining the loop length based at least in part on the comparisons.

Another feature of an embodiment of the invention includes an apparatus for single-ended line testing (SELT) to provision xDSL service. The apparatus includes a processing unit adapted to generate a time-continuous signal. The processing unit may perform additional functions of the apparatus as well. A transmitter converts the time-continuous signal to an analog test signal and to transmit the analog test signal through a loop to be tested. A receiver receives an echo response signal resulting from the transmission of the analog test signal. A band-pass filter reduces near-end echo in time-domain. A correlator correlates the transmitted analog test signal and the received echo response signal and generates an echo response function. A bump compensation filter applied to the echo response function to mitigate undesired bumps and a match filter applied to the echo response signal and a far-end echo template to obtain a matched echo response. A time-dependent scaler adapted to scale the matched echo response to compensate for loop attenuation and a median filter applied to the scaled echo response to mitigate background noise and enhance peaks for detection. The processing limit calculates a length of the loop based at least in part on the position of the peaks.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

The following description is intended to convey a thorough understanding of the invention by providing a number of specific embodiments and details involving the structure and operation of a novel apparatus, of the present invention. It should be understood, however, that the present invention is not limited to these specific embodiments and details, which are provided for exemplary purposes only. It should be further understood that one possessing ordinary skill in the art, in light of known apparatuses and methods, would appreciate the use of the invention for its intended purposes and benefits in any number of alternative embodiments, depending upon specific design and other needs.

Figure 1:
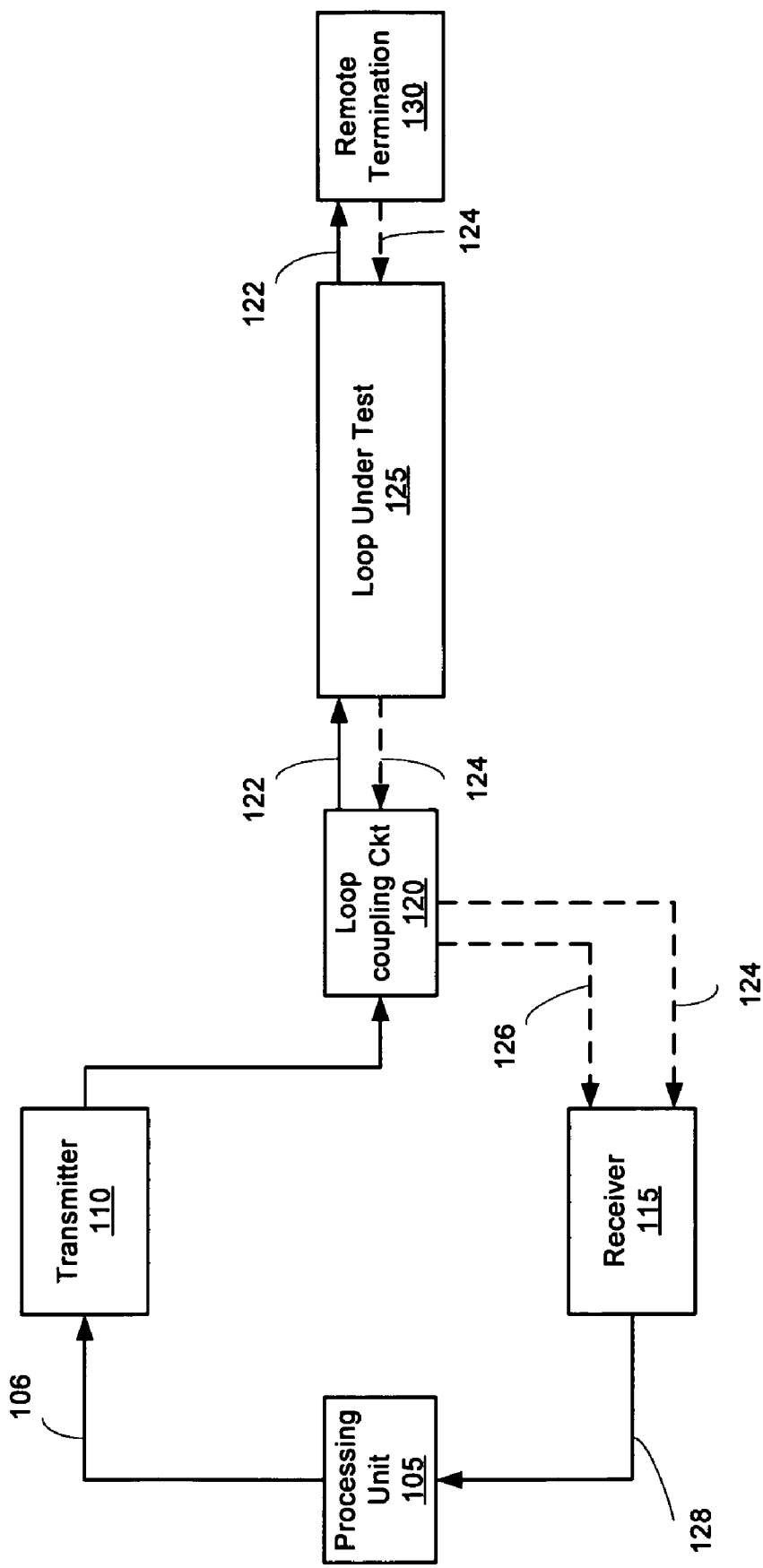
FIG. 1 is a block diagram representation of a single-ended line testing according to an embodiment of the invention.

According to an embodiment of the present invention, and in reference to FIG. 1, the loop testing is initiated by processing unit 105, such as at a CO, that generates and provides pseudo-random digital signal 106 to transmitter 110, which converts the signal 106 to an analog test signal. The analog test signal is transmitted to loop coupling circuit 120 that contains, for example, a hybrid, transformer and other circuitry that conditions the analog signal for transmission through loop under test 125. From coupling circuit 120 the test signal may be attenuated by existing loop termination devices, such as bridge taps (that cause impedance mismatches) and load coils (that act as low-pass filters), which may prevent the use of higher frequencies used to transmit DSL signals. The signal is finally transmitted to a remote terminating device 130, such as a telephone, a POTS/PSTN termination box, etc., and reflected back as an echo response signal 124 through loop under test 125, and to loop coupling circuitry 120. Receiver 115 receives the reflected or bounced echo response signal and delivers it to processing unit 105 for processing to ascertain loop length and loop termination aspects of the DSL loop. Of critical important in determining loop length is the far-end echo response. Because the loop coupling circuitry 120 causes a near-end echo residue in the echo response signal 124, as seen by receiver 115, filtering and/or other conditioning must be applied to remove the obscuring effect of this rear-end echo response. The goal of the filtering and removal of the near-end echo is to enhance detection of peaks of the far-end echo response.

Figures 2A, 2B:
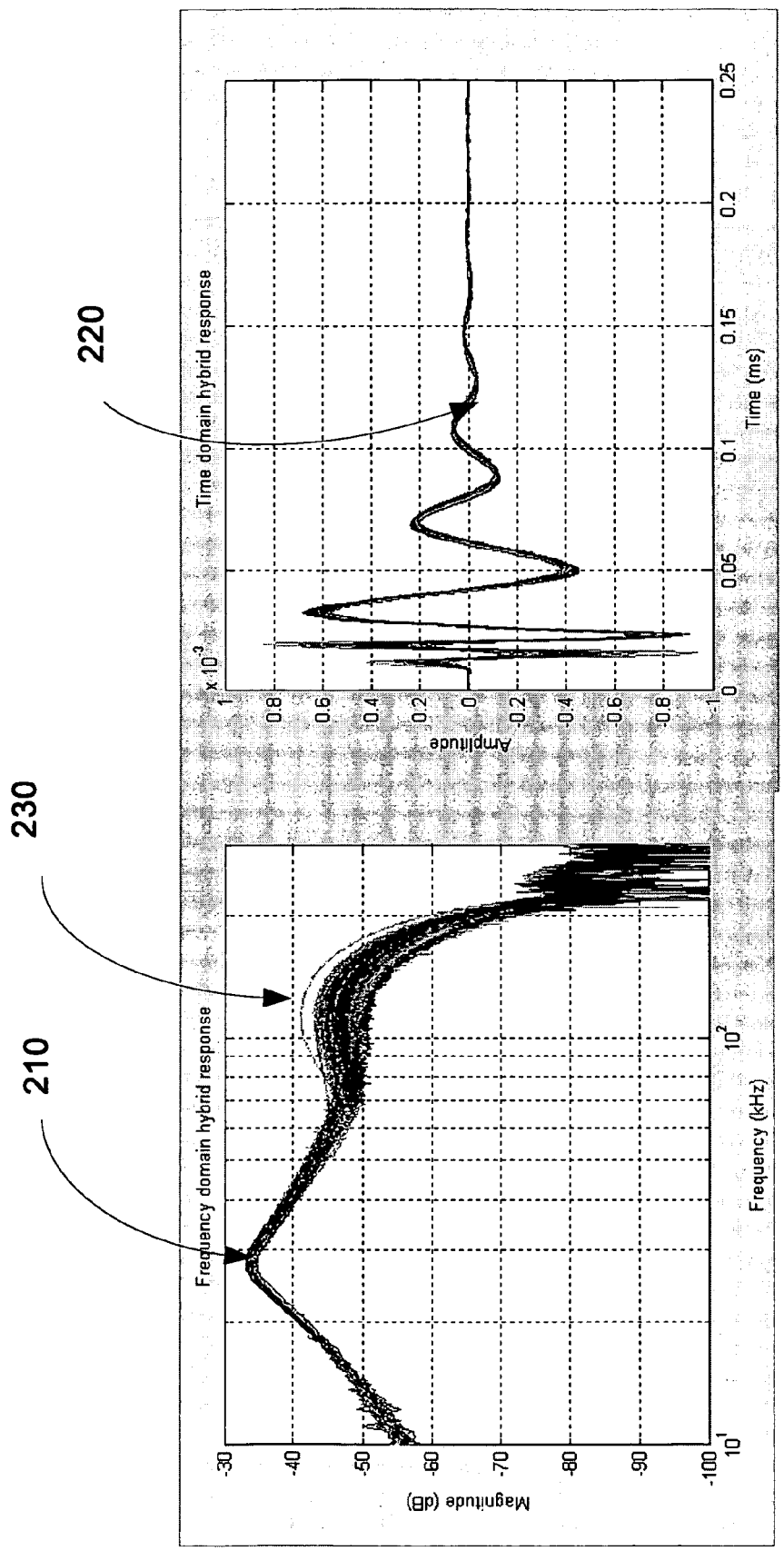
FIG. 2(a) is a graphical representation of a frequency-domain hybrid response derived from a SELT embodiment of the invention.
FIG. 2(b) is a graphical representation of a time-domain hybrid response derived from a SELT embodiment of the invention.

In one embodiment of the present invention, and in reference to the graph of FIGS. 2(a) and 2(b), a bump compensation filter, such as provided by processor 105, is implemented with the knowledge of the behavior of the near-end echo, which is closely related to a hybrid response, to remove strong background noise. FIG. 2(a) represents 64 frequency domain hybrid responses 230 and demonstrates that the frequency domain hybrid response has a bump 210 appearing around 25 kHz bump 210 which is responsible for ringing 220 in time domain, as illustrated by the graph of FIG. 2(b). Because the extended tail portion of the near-end echo resulting from the ringing may prevent the desired far-end echo from being detected, it often is preferable to remove or reduce the bump before detection is made. A bump compensation filter (BCF) may be introduced, either digitally by processor 105 or in analog fashion for removing such a bump.

Figures 3A, 3B:
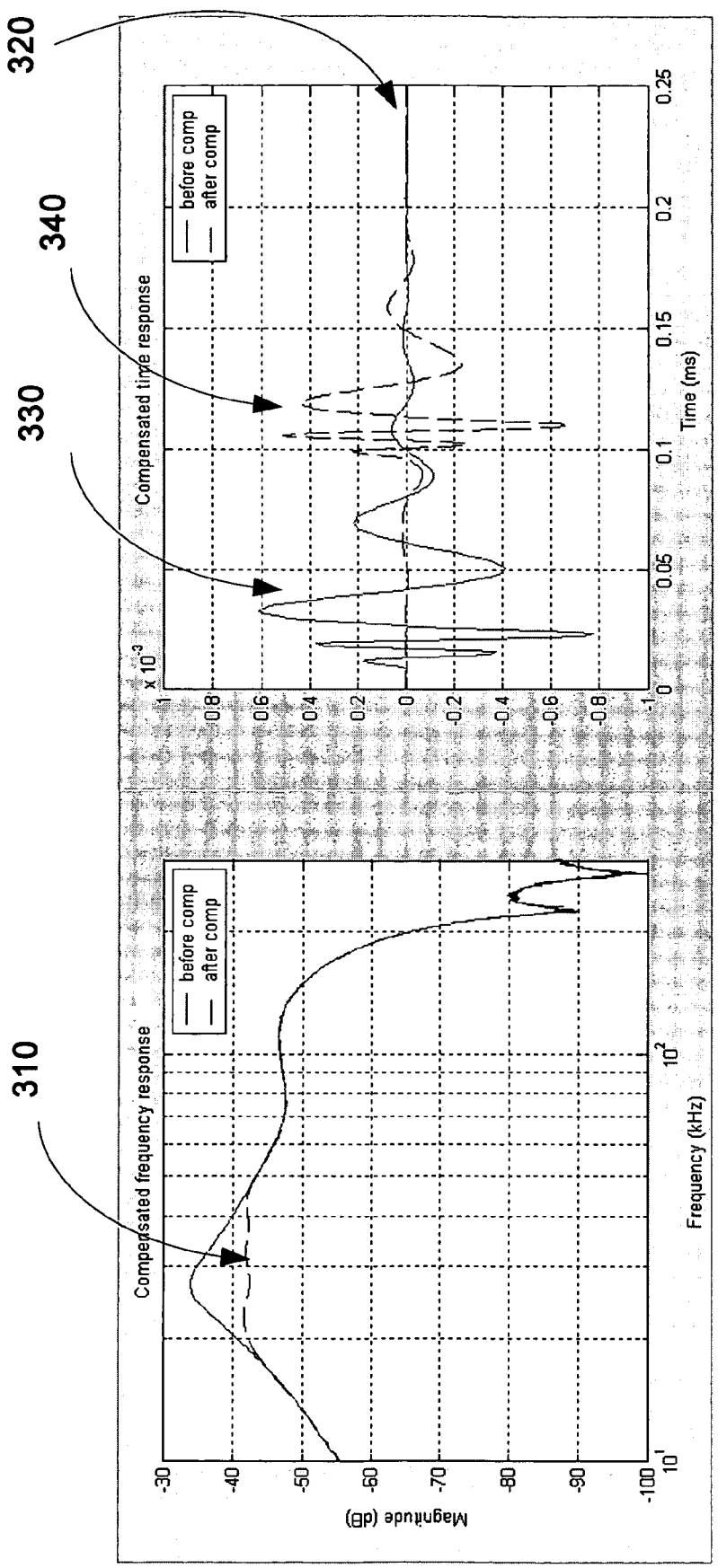
FIG. 3(a) is a graphical representation of a compensated frequency-domain hybrid response derived from a SELT embodiment of the invention.
FIG. 3(b) is a graphical representation of a compensated time-domain hybrid response derived from a SELT embodiment of the invention.

In this example, the 64 hybrid responses are computed on data collected from eight ports of each of eight DSL hardware platform devices associated with the hybrid devices continued in the coupling circuit 120, e.g., devices manufactured by Legerity, Inc. of Austin, Tex., for 18 kilofeet (kft) open loops. Although the hybrid responses vary from one hardware platform device to another hardware platform device, the variation is not dramatic and all the responses are similar in that their bumps 210 appear around the same location. Thus, a compensation filter for each board may not be required and a single filter may be utilized based on the average of multiple measurements. In the instant embodiment of the present invention, a linear phase least square criterion for the bump compensation filter is implemented. As demonstrated by FIGS. 3(a), for the compensated frequency domain response, and; (b), for the compensated time domain response, the compensated frequency response 310 is shown to be relatively flat around 25 kHz. Also there is less ringing 320 at the tail of the time domain response. In addition, bump compensation filters introduces a delay in the time domain of about 0.088 ms that may affect the relative alignment between the two curves 330 and 340 in FIG. 3(b). In this exemplary embodiment, the delay is applied to both near-end echo and far-end echo so as to not affect the loop detection.

As shown in from FIG. 2(a), the near-end echo response 230 typically changes from device to device, although the basic features (i.e., shape, peak position) the responses remain the same. To get a baseline near-end echo to be used in all loops under test, the present invention, in one embodiment, averages multiple measurements and removes the average background significantly, thereby, enhancing the far-end echo signal relative to other signals enhancing peak detection.

Because the relatively weak far-end echo is submerged in the strong background of the near-end echo, it is desirable to remove this background before further signal processing. Moreover, because signal strength attenuates as it passes through the wireline, the received signal from a longer loop is dominated even more by the near-end echo. If the length of the loop is long enough (e.g., 18 kft), the received measurements can be regarded as a near-end echo replica.

Figure 4:
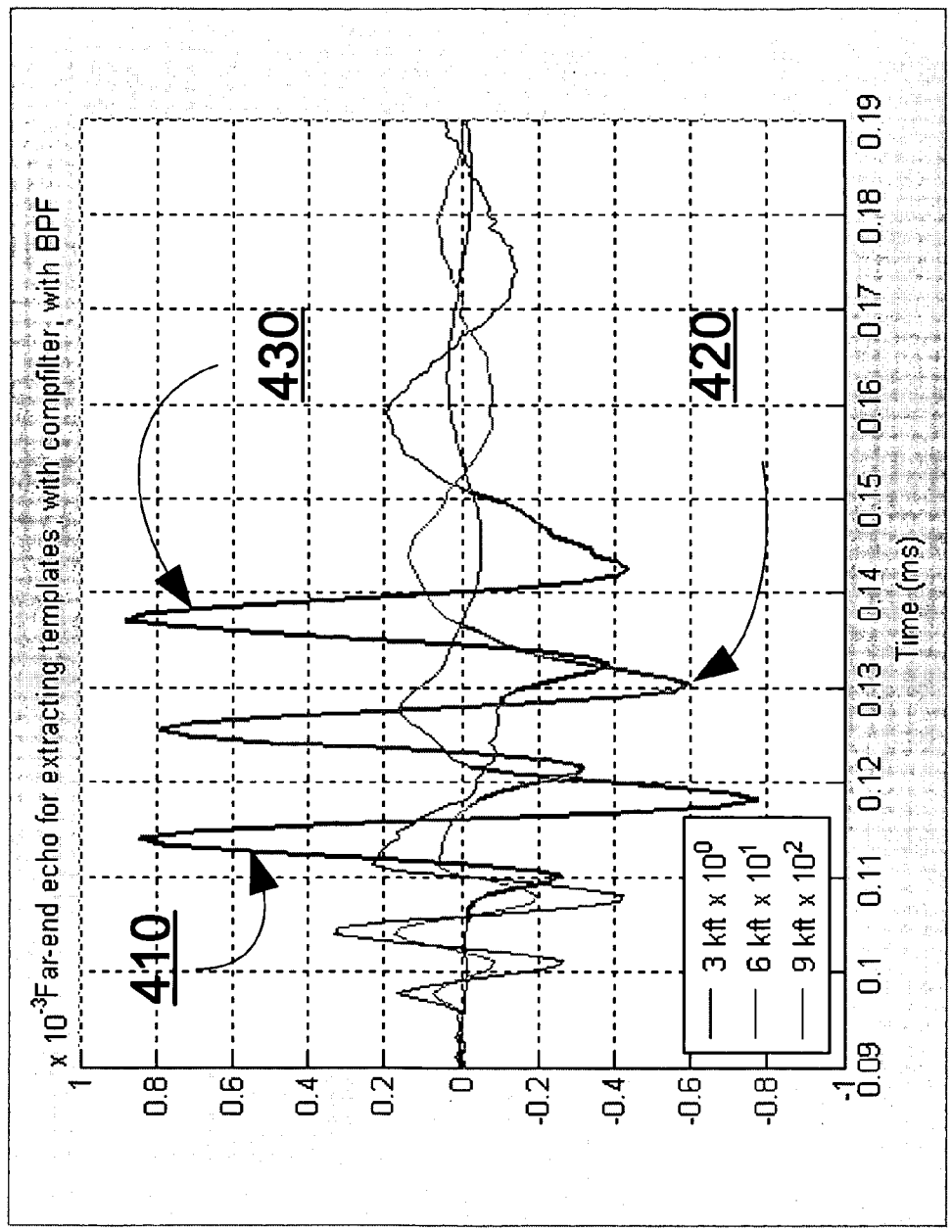
FIG. 4 is a graphical representation of a series of far-end echo templates at distance of 3 Kft, 6 Kft, and 9 Kft used in a SELT embodiment of the invention.

In another embodiment of the present invention, and in reference to FIG. 4, a far-end echo template may be extracted from a set of measurements by removing the self near-end echo background and then cross-correlated with the signal after removing the background, thereby providing a peak that indicates the appearance of the desired response. The rationale behind using a far-end echo template is the concept of the matched filtering. The desired signal is then enhanced relative to other background variations. The far-end echo templates can be obtained from a set of measurements by removing the self near-end echo background. With reference to FIG. 4, the method and apparatus of the present invention utilizes three templates 410, 420 and 430, that correspond to loop lengths of 3000, 6000 and 9000 feet respectively, which yield a similar response shape, and nearly the same loop estimation performance, allowing a fixed template, or in other words, a matched template to be applied on all loops under test.

Even after template matching, there still exists certain background on which the desired far-end echo rides, it is necessary to remove this residual background to facilitate correct detection. In one embodiment of the present invention, a median filter is implemented in removing any remnants of a background noise. A standard non-linear filtering technique, a median filter has the property of effectively removing peaks (i.e., a sign reversal of slope) while leaving the other, slower rate, variations intact. In one embodiment, the output of the median filter is subtracted from the original signal, leaving the peaks only. Such a method is particularly effective in peak enhancement, when there are small peaks riding on gentle, but high amplitude background variations. The order for the median filter (the filtering window size) is critical in deciding the type of peaks to enhance. A higher order (larger window size) includes wider peaks into the enhanced features. A lower order (smaller window size), on the other hand, enhances only the tips of peaks. In the present invention, a 21-order median filter has been determined as optimal, although other orders may be used in accordance with the present invention.

FIGS. 5(a)-7 relate to exemplary simulation performed using the SELT invention described herein and are described in detail below.

Figure 8:
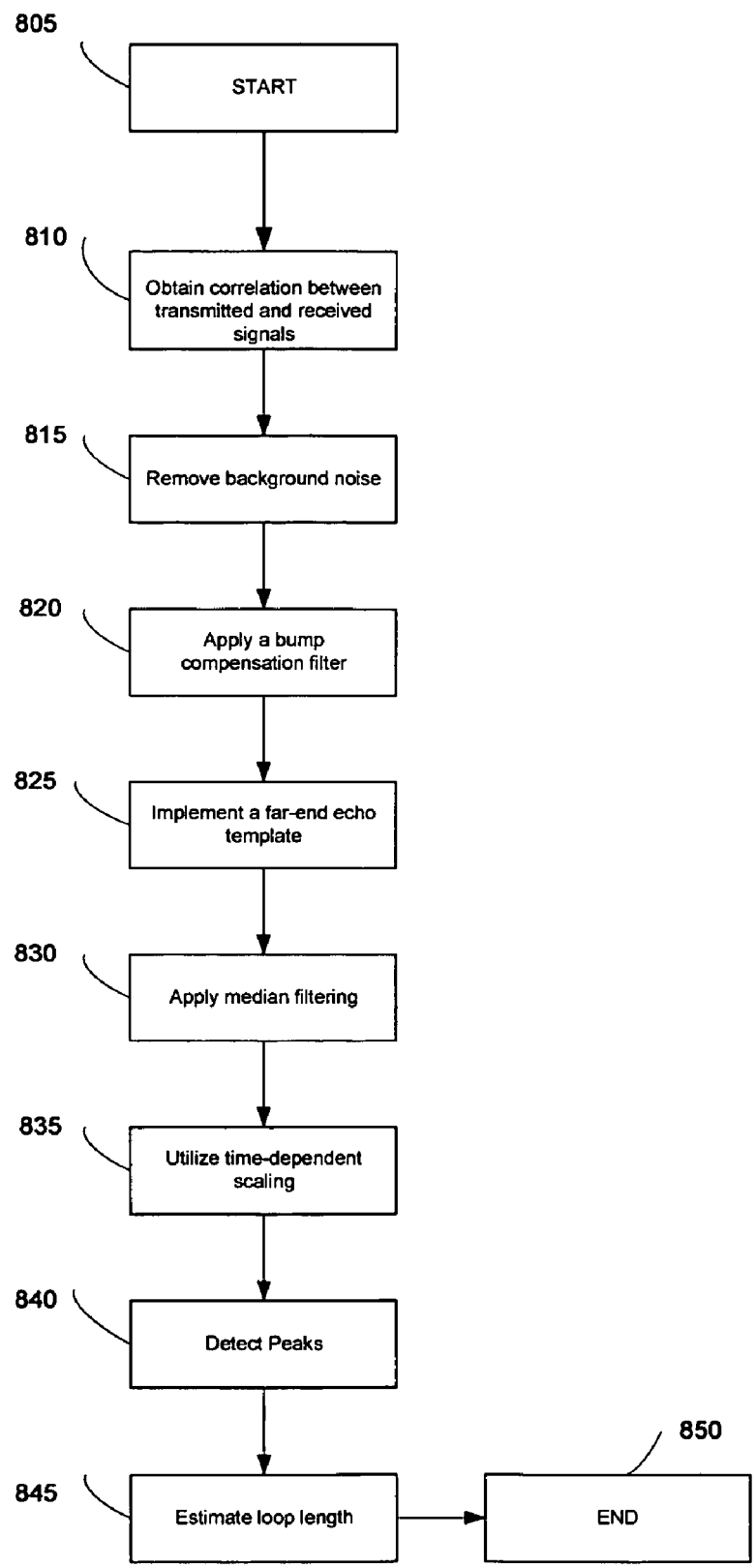
FIG. 8 is a flowchart of loop length determination steps according to an embodiment of the invention.

With reference to FIG. 8, an exemplary SELT procedure is disclosed for determining loop length and termination effects. In step 810, a cross-correlation between the transmitted analog tests and the received echo response signal is obtained. A time-dependent echo response is obtained from the correlation. The average signal power of the echo response is increased without increasing peak signal levels to enhance signal-to-noise ratio. The cross-correlation between the transmitted tests signal and received echo response signal may be a time-domain response. A time line is established based on known sampling rates. In step 815, the near-end echo is obtained through averaging over multiple 18 kft open loop measurements to remove background noise.

The averaged baseline is removed from the compensated responses, and in step 820, a bump compensation filter is applied to the correlation function to mitigate a bump that appears around the 25 KHz frequency in the frequency-domain hybrid response which is also responsible for ringing in the time domain. The bump compensation filter is designed based on the baseline near-end echo averaged over multiple measurements, and is fixed for loops under examination. In step 825, a far-end peak template corresponding to a loop length of, for example, 6,000 feet is implemented in the testing of all the loops. Cross-correlating the echo response with the implemented far-end peak template may be performed to obtain and/or enhance peaks for detection by enhancing the far-end echo relative to the near-end echo. The established time line is then adjusted, so that for a 6,000 feet loop response, zero time would translate to a perfect alignment of the far-end echo with the far-end peak template. In step 830, median filtering is applied to the correlated response to enhance the peaks, where the difference between the original signal and the median filter output substantially consists of peaks. Considering that signal strength attenuates as loop length increases and that the later the peak appears the longer the loop length time dependent scaling of $10^{\alpha i}$ ($\alpha$>0) is used to take the far-end echo peak strength into account. in this manner, a fixed threshold independent of loop length may be attained in step 835 to enhance peak detection.

In step 840, the scaled data is divided into regions of the same sign (positive or negative) and the maximum absolute value in each region is identified as the peak value with the corresponding peak position. The first (i.e., earliest time) peak that exceeds the threshold is used as the far-echo peak. Peak polarity indicates the loop termination condition, i.e., open or closed. Finally in step 845, linear coefficients are calculated using a least squares fit of the measured data from known loops to estimate loop length. The position (in time) of the far-end echo peak is linearly dependent on the loop length. These coefficients are subsequently used to determine loop length from the peak position.

Figure 9:
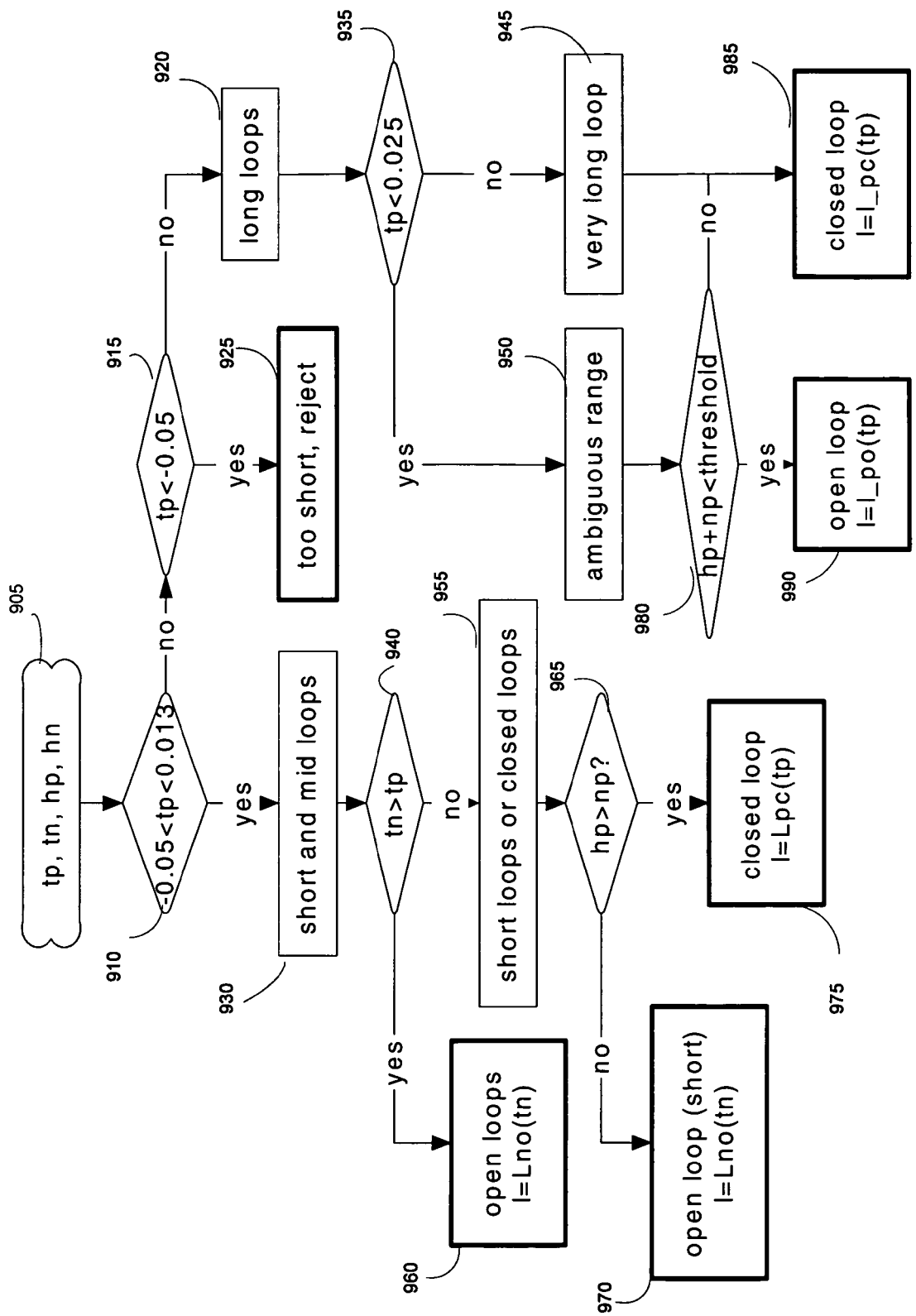
FIG. 9 is a flowchart of loop length determination steps according to an embodiment of the invention.
Figure 10:
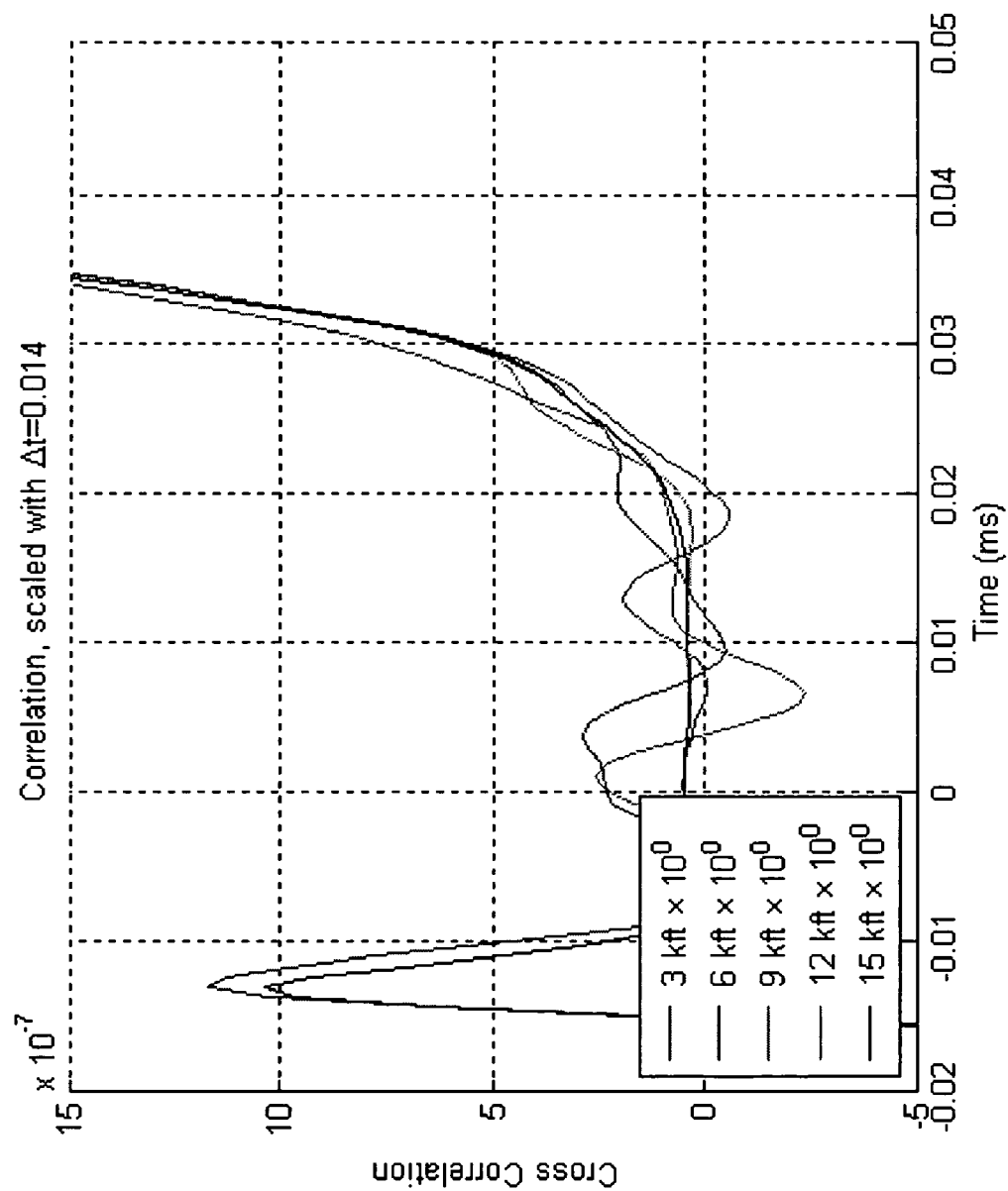
FIG. 10 is a graphical representation of a scaled echo from loops with different lengths according to an embodiment of the invention.
Figure 11:
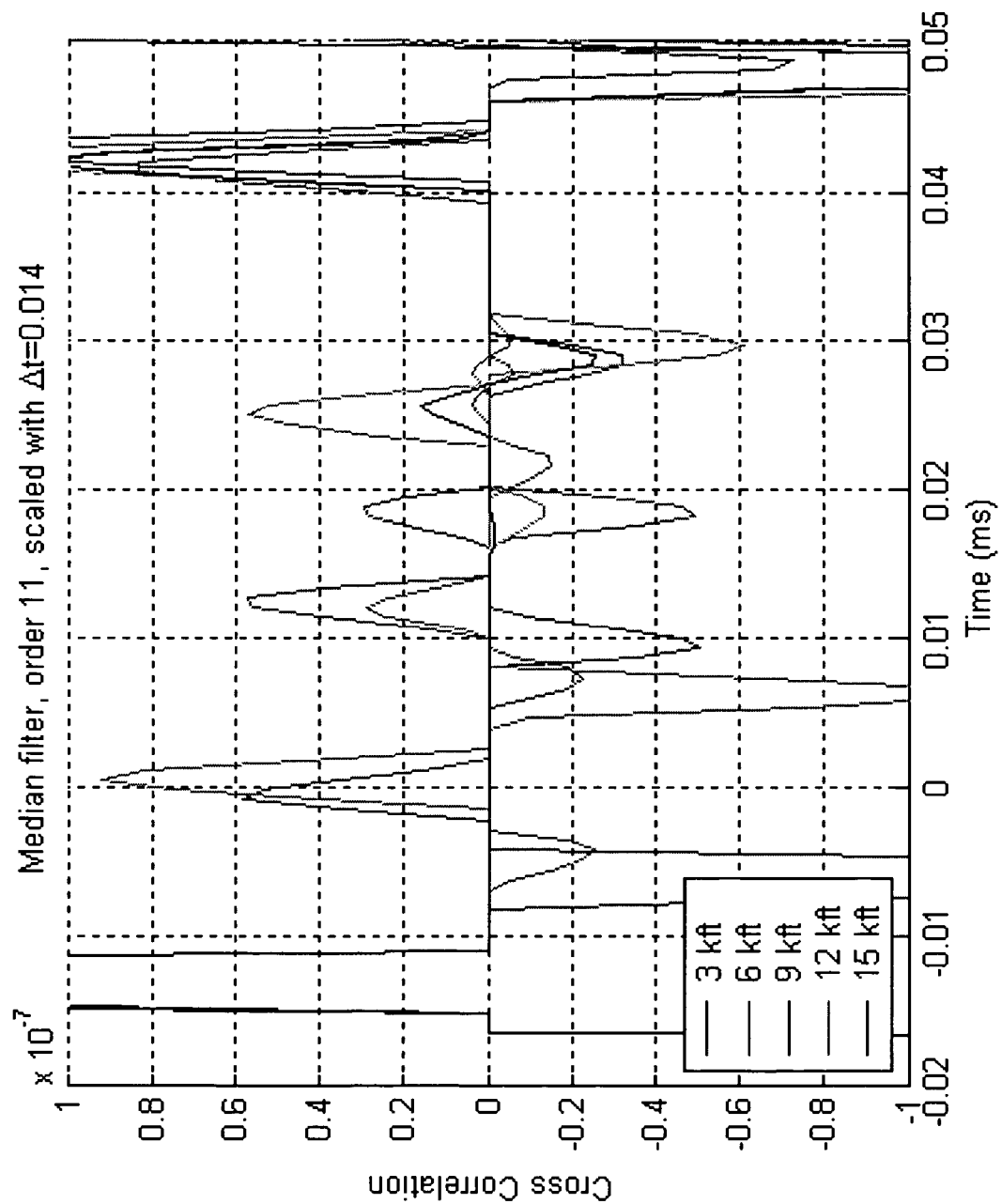
FIG. 11 is a graphical representation illustrating positive and negative far-end echo peaks according to an embodiment of the invention.

With reference to FIG. 9, according to the SELT process of the invention, loop length may be determined using one of four linear equations. The exemplary method of determining the length of a loop of FIG. 9 starts with step 905, where positive and negative peak position (tp and tn) as well as positive and negative peak heights (hp and np) are employed to ascertain loop lengths. In step 910, the positive peak position tp in seconds is compared against a range of between −0.05 seconds and 0.013 seconds. If it is determined that tp is within this range (yes), then the method moves to step 930, where it is ascertained that the loop is a short or mid length loop. If tp is not within this range (no), then the method moves to comparison step 915. If tp is less than −0.05 seconds (yes), then the loop is a short loop and the length estimation process stops at step 925. If tp is greater than −0.05 seconds, it is ascertained that the loop is a long loop at step 920 and the method checks whether tp is less than 0.025 seconds at step 935. If tp is less than 0.025 seconds (yes), then it is assumed to be an ambiguous range at step 950. At step 980, the positive and negative peak heights are added together and compared to determine if the result is less than a predefined or definable threshold. If the result is less than the threshold (yes), then the loop is an open loop and loop length is determined using the function shown at step 990. If the result is not less than the threshold (no), then it is a closed loop and loop length is determined using the function shown at step 985.

If the answer to step 935 is determined to be a no, i.e., tp is not less than 0.025 seconds, then it is determined the loop is a very long loop at step 945. The process then goes to step 985 where the loop is determined to be closed and loop length is determined using the function shown at step 985.

From step 930, where the loop is determined to be of a short or mid length, negative peak position tn is compared with positive peak position tp in step 940. If position tn is not greater than tp (no), then it is determined that the loop is short or closed in step 955. The method compares whether the positive peak hp is greater than the negative peak np at step 965. If hp is greater than np (yes), then it is determined that the loop is a closed loop and loop length is determined using the function shown at step 975. If hp is not greater than np (no), then it is an open loop and loop length is determined using the function shown at step 970.

If the answer to the comparison of step 940, is a "yes", i.e., tn is greater than tp, then the determination is made that the loop is an open loop and loop length is determined using the function shown at step 960.

Figure 12B:
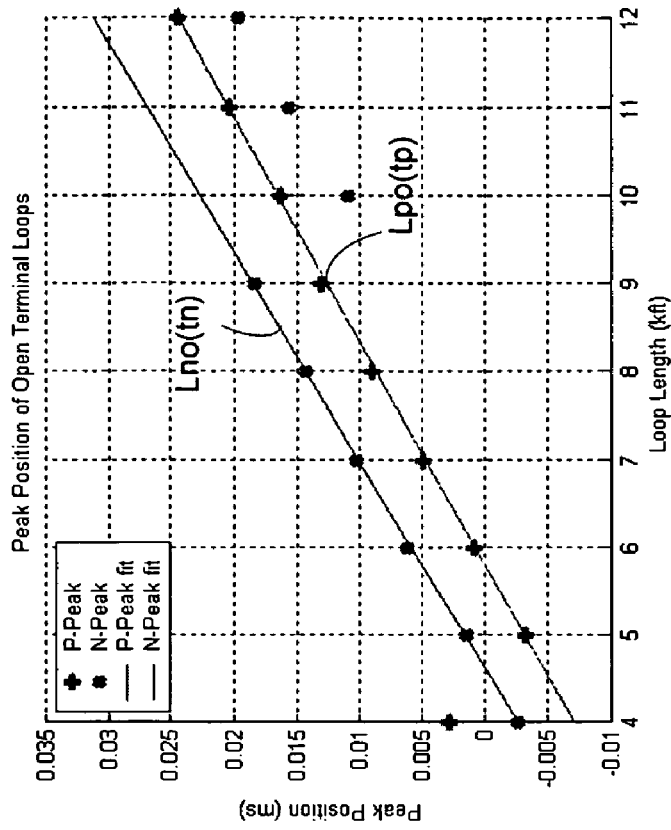
FIG. 12(b) is a linear graph illustration of peak positions versus loop lengths for open terminal loops according to an embodiment of the invention.
Figure 12A:
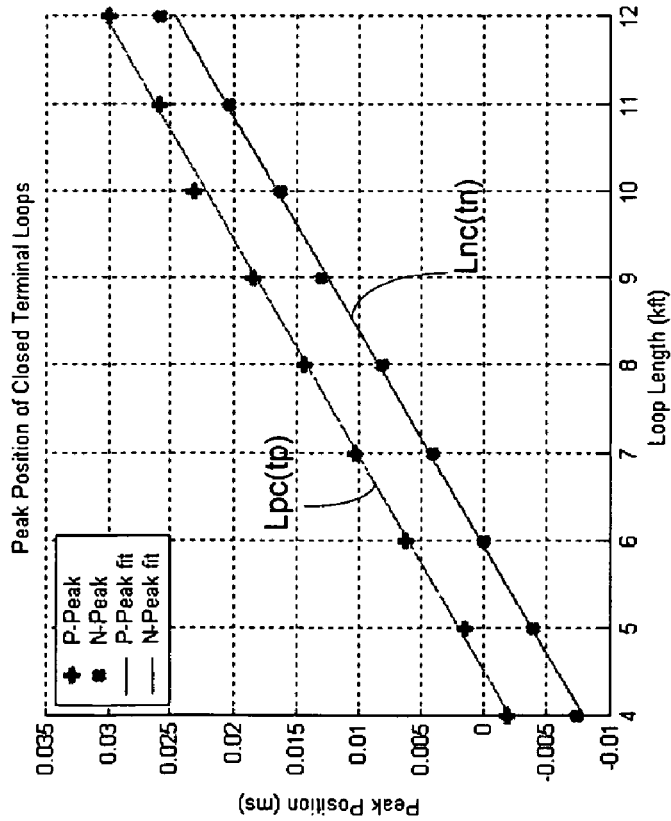
FIG. 12(a) is a linear graph illustration of peak positions versus loop lengths for closed terminal loops according to an embodiment of the invention.

FIGS. 12(*a*) and 12(*b*) are linear graph illustrations of peak positions versus loop lengths for closed and open terminal loops as derived from the functions and as described above. The formulas used for computing the loop lengths (in kft) from positive and negative peak positions (in ms) are derived from the following:

$$t_i = k_i l + b_i \text{ i stands for either p or n, for positive or negative peak}$$

Where, $t_i$—is the peak position in milliseconds;

$k_i$—is a slope of the linear equation; and $b_i$—is the intercept of the linear equation.

From this equation above, four linear functions for calculating the loop length for terminal loops is calculated as follows:

$$l_{po} = (t + 0.0230)/0.0040$$

$$l_{no} = (t + 0.0196)/0.0042$$

$$l_{pc} = (t + 0.0184)/0.0041$$

$$l_{nc} = (t + 0.0242)/0.0041$$

The parameters, description, determination and dependence are summarized in Table 1 below.

TABLE 1

| parameter | description | determination | dependence |
|---|---|---|---|
| Tx sequence | Tx signal, a bit sequence | By design, a PN sequence of 4095 bits | DSP code |
| background | Average near-echo response | Measured from a large number of hardware units | HW platform |
| compensation filter | filter to compensate hybrid response | Designed according to measured data | HW platform |
| template | template filter to enhance far-echo peaks | From measured data | possibly loop type |
| time-scaling | α in scaling $10^{\alpha t}$ | From measurement data to equalize far echo | loop type |
| time-distance coefficient | Two coefficients determining the linear relation between peak position and loop length | From measurement data of known loop lengths | loop type |

TABLE 1-continued

| parameter | description | determination | dependence |
|---|---|---|---|
| threshold | Used to reject small amplitude peaks | Compromises reached during study | loop type, HW platform |
| filter order | Median filter order | Compromises reached during study | |

Figure 5A:
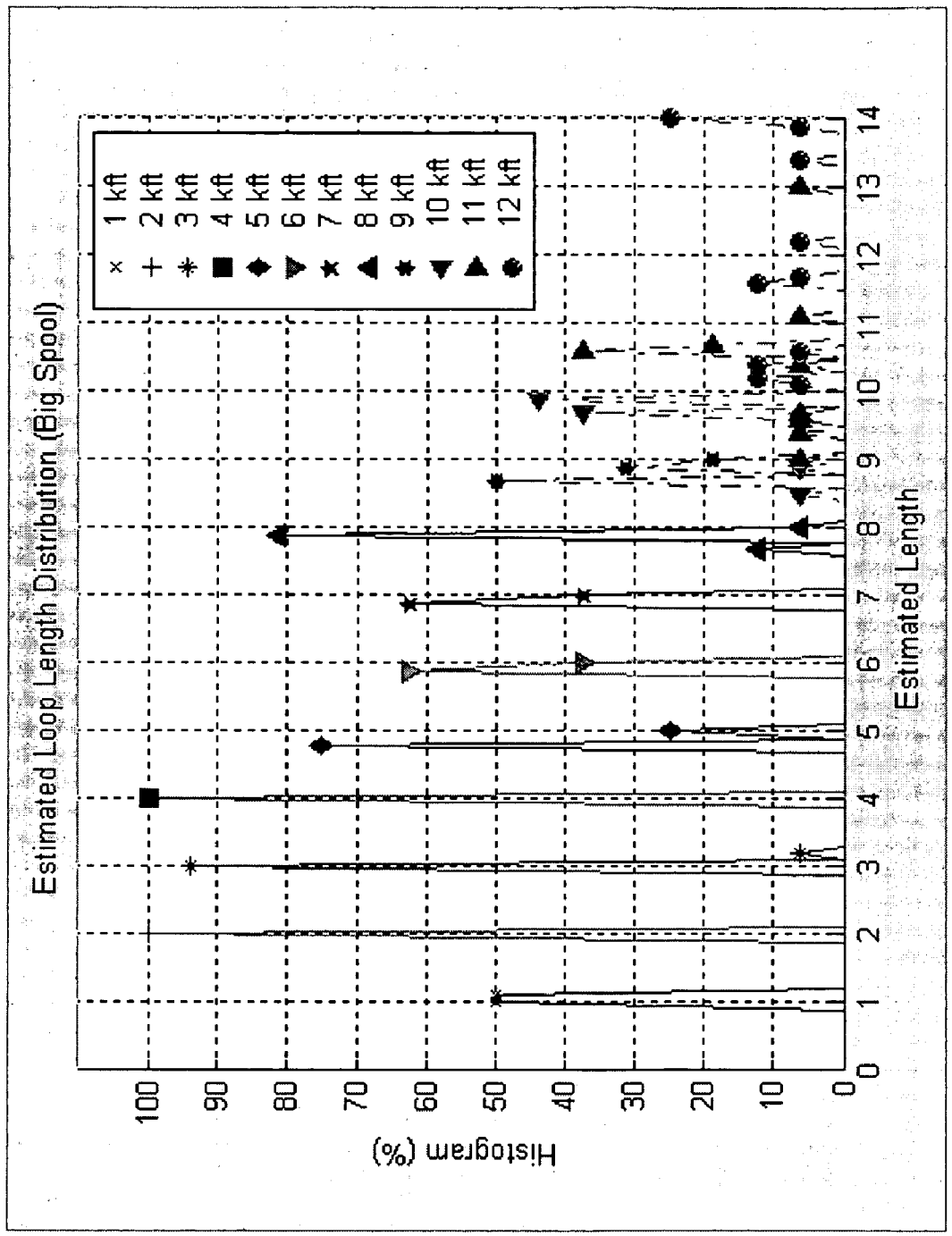
FIG. 5(a) is a graphical representation of an estimated loop length distribution using a big spool simulator according to an embodiment of the invention.
Figure 5B:
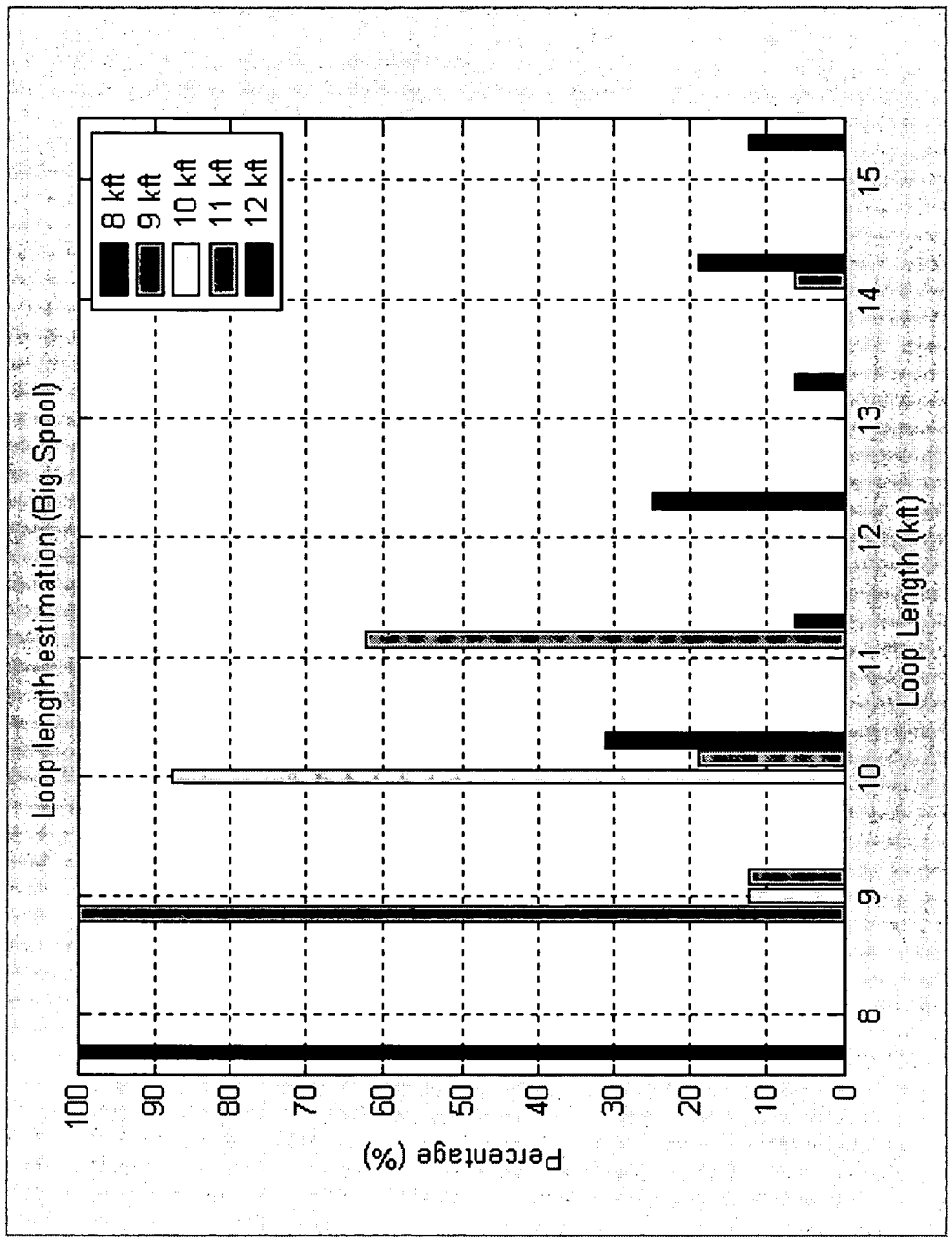
FIG. 5(b) is a graphical representation of loop length using big spool simulator according to an embodiment of the invention.
Figure 6A:
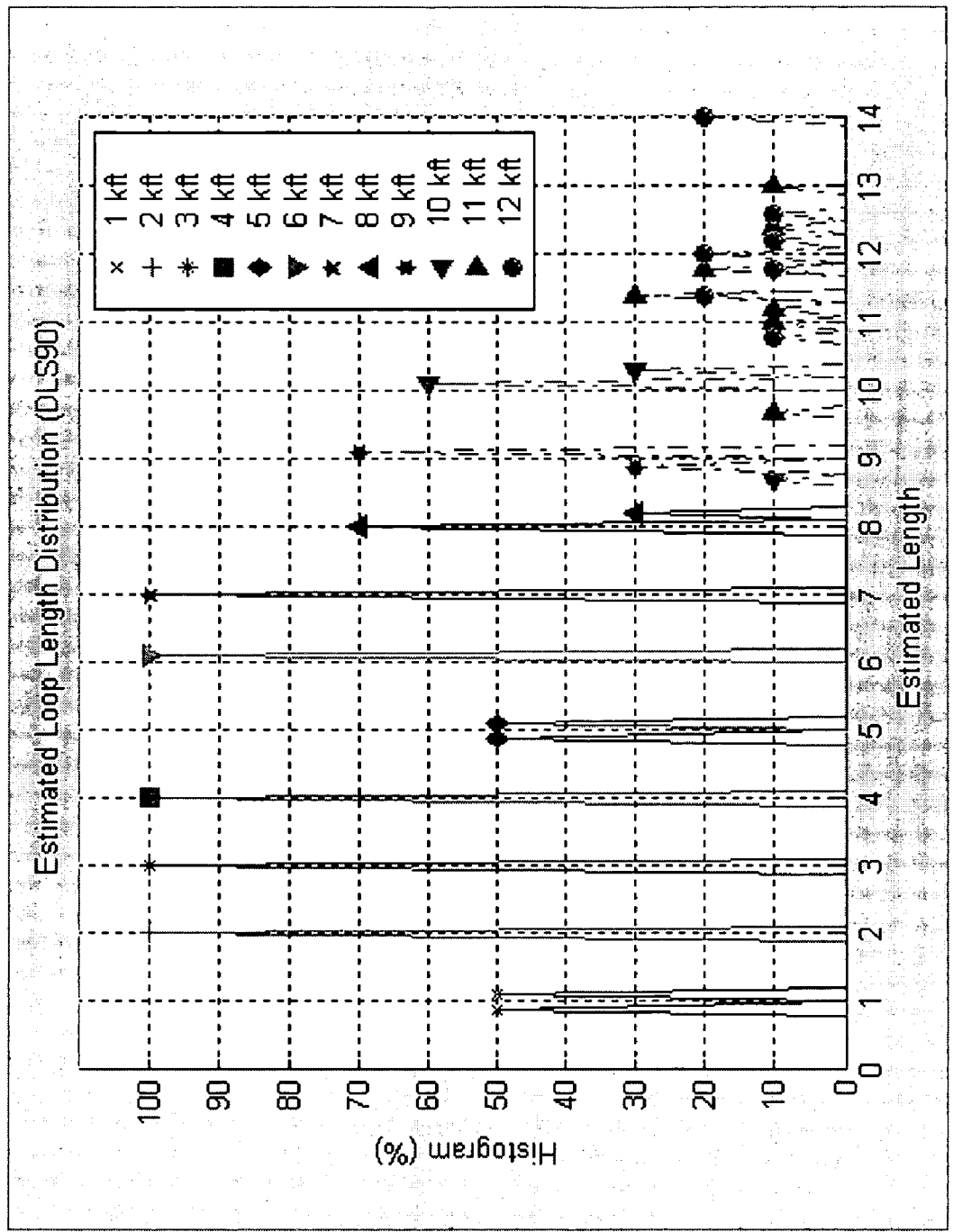
FIG. 6(a) is a graphical representation of estimated loop length distribution using DLS90 loop simulator according to an embodiment of the invention.
Figure 6B:
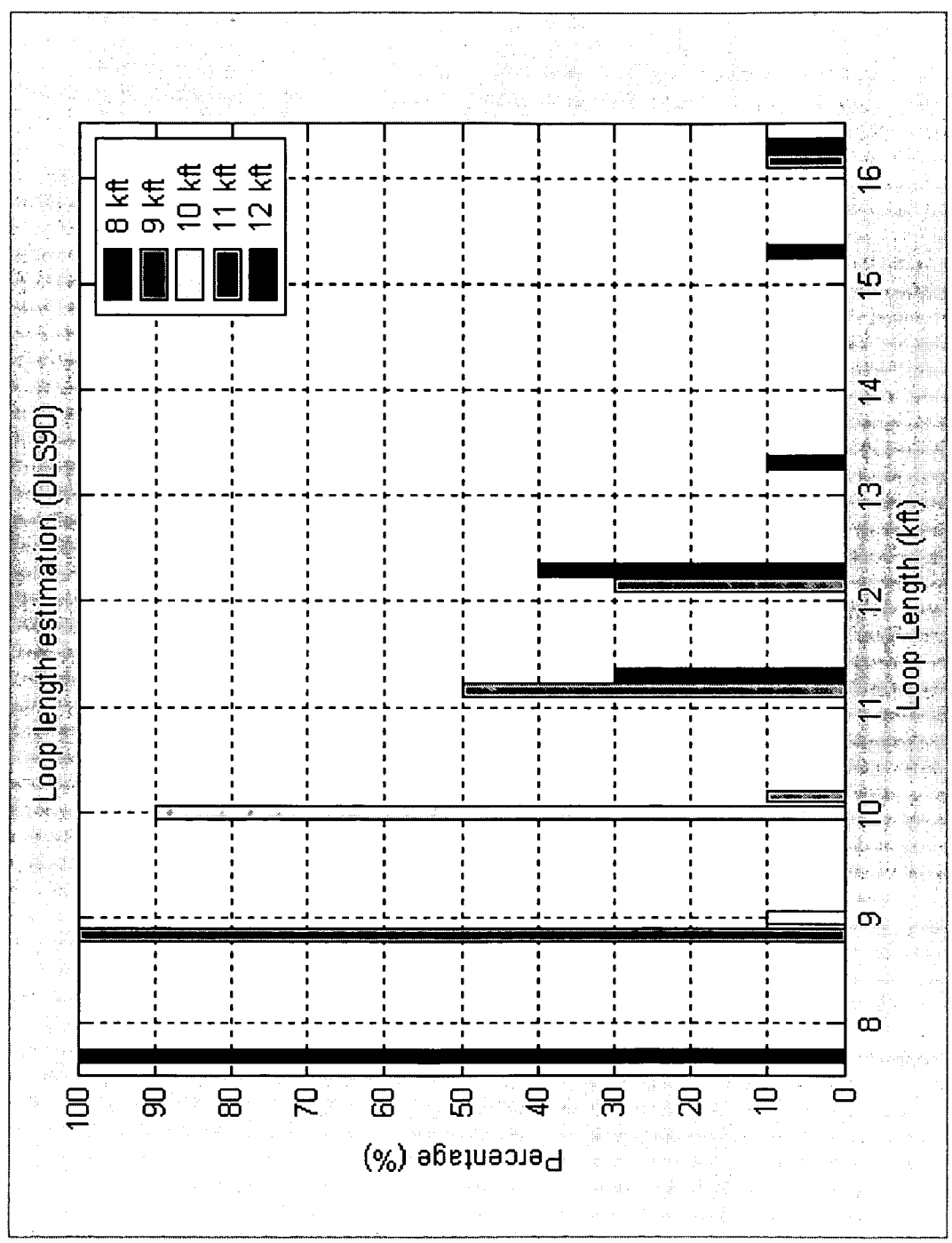
FIG. 6(b) is a graphical representation of loop length using DLS90 loop simulator according to an embodiment of the invention.

In another exemplary simulation, the SELT process of the invention is applied to two 26 American Wire Gauge (AWG) loop simulators: a big spool simulator (FIGS. 5(*a*) and 5(*b*)) and a Spirent DLS90 loop simulator (FIGS. 6(*a*) and 6(*b*)). For the big spool loop simulator, data was collected from eight DSL hardware platform devices, such as manufactured by Legerity, Inc., of Austin, Tex. Sixty-four 18 kft open loop measurements were taken from eight ports of eight DSL hardware platform devices. These measurements served as the baseline and twenty-four varying loop length (from 1 kft to 12 kft incremental by 1 kft) measurements for each device (both open and closed termination) were used to verify the algorithm. Similar tests were performed using the DLS90 loop simulator of FIGS. 6(*a*) and 6(*b*), except that five DSL devices were involved in the verification. The following observations were made: 1) the performances of the big spool and the DLS90 loop simulator were very similar; 2) in both cases loops up to 9,000 feet were obtained that may work on all of the DSL devices under examination; and 3) for both loop simulators, a 90% correct decision at 10,000 feet was obtained, and more than half the loops were correctly estimated at 11,000 feet.

Figures 7A, 7B:
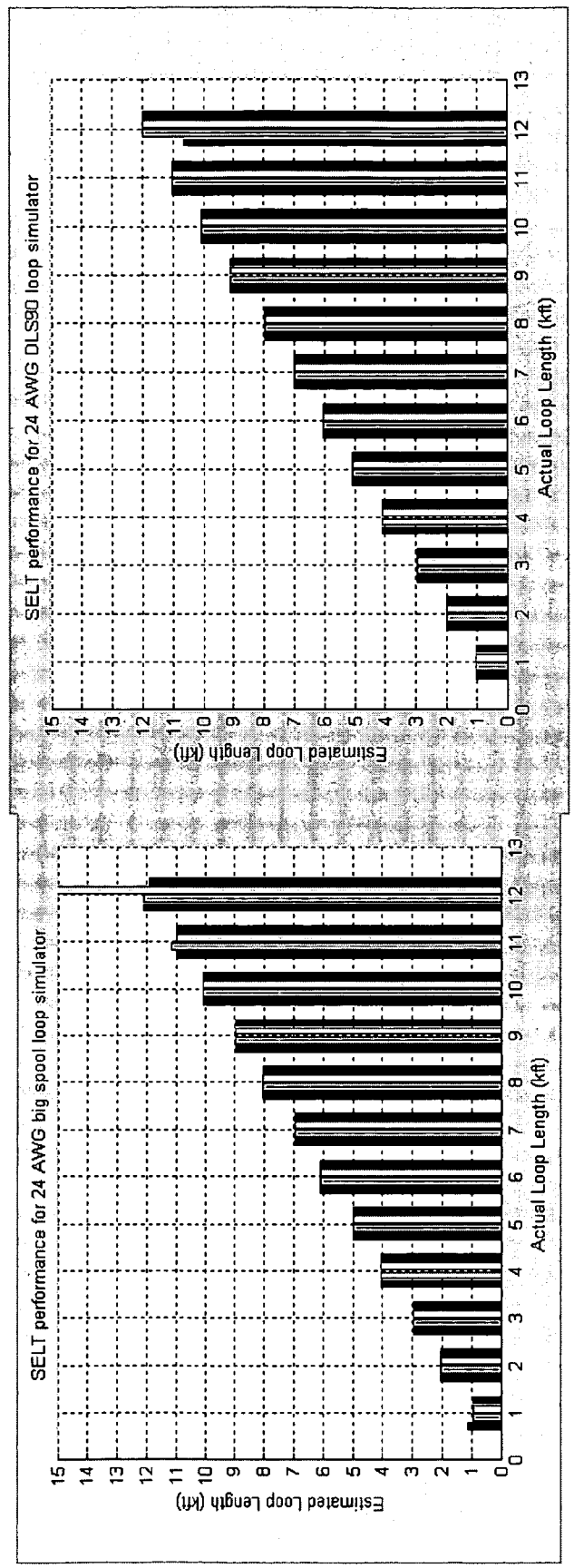
FIG. 7(a) is a graphical representation of SELT performance for a 24 AWG using big spool loop simulator according to an embodiment of the invention.
FIG. 7(b) is a graphical representation of SELT performance for a 24 AWG using DLS90 loop simulator response according to an embodiment of the invention.

In another simulation, the SELT process was applied to two 24 AWG loop simulators, big spool and DLS90. Because the diameter of 24 AWG wire is larger than that of 26 AWG wire, reflected signals are stronger for 24 AWG wire. Therefore, it was expected that the estimation of 24 AWG loop length would be easier, as compared to 26 AWG estimation, and as much was confirmed by the simulations. For each simulation, 48 measurements were obtained from two DSL hardware platform devices for loops ranging from 1,000 feet to 12,000 feet, both open and close terminated. In this simulation, the background near-end echo portions of the measurements from the counterpart 26 AWG loop simulation were reused and the compensation filters for 26 AWG were also reused. However, the coefficients relating the peak position to the loop length were recalculated. FIG. 7 shows that for both loop simulators, highly accurate estimations for loops up to 11,000 feet were obtained. The average percentage of correct detection for loops beyond 11,000 feet to 12,000 feet was higher than 75%.

The bump compensation filter (BCF) may also match the phase response of the hybrid circuitry (i.e., a linear equalization), thereby allowing more suppression of the ringing. Other exemplary variations (not shown) demonstrate that the phase responses are also very similar among the different DSL devices, therefore, the bump compensation filter of the present invention may be used as a phase-matching filter.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

We claim:

1. A method for single-ended line testing (SELT) to provision xDSL service, the method comprising:
generating an analog test signal derived from a time-continuous signal and transmitting the analog test signal through a loop to be tested;
receiving a time-dependent echo response signal;
applying band-pass filtering to reduce near-end echo in time-domain;
cross-correlating the transmitted analog test signal and the received echo response signal to obtain an echo response function;
applying bump compensation filtering to the echo response function;
match filtering the echo response signal function with a far-end echo template;
time-dependent scaling the matched echo response to compensate for loop attenuation;
median filtering the scaled echo response to remove background noise and enhance peaks for detection; and
determining a length of the loop based at least in part by the position of the peaks.

2. The method of claim 1, wherein the bandpass filtering suppresses the high frequency transmitted analog test signal.

3. The method of claim 1, wherein the bump compensation filtering is achieved at least in part by a processor.

4. The method of claim 1, wherein the match filtering allows the detection of the peaks of the echo response.

5. The method of claim 1, wherein match filtering is achieved by a processor.

6. The method of claim 1, wherein the time-dependent scaling of the far end echo is in the form of $10^{\alpha t}$, where $\alpha > 0$.

7. The method of claim 1, wherein median filtering provides modeling of the echo response.

8. The method of claim 1, wherein the scaled echo response is subtracted from the background, leaving peaks that represent the echo response.

9. The method of claim 1, wherein loop length is determined by the position of both positive and negative peaks.

10. A method for determining loop length in provisioning xDSL service, the method comprising:
acquiring far-end echo peaks by correlating an echo response with a far-end echo peak template;
comparing at least two of positive peak positions, positive peak heights, negative peak positions, and negative peak heights;
comparing a positive peak position with a range of times;
comparing a positive peak height with a negative peak height;
comparing a negative peak position with a positive peak position; and
determining the loop length based at least in part on the comparisons.

11. The method of claim 10, wherein the loop is a short or mid-length loop when the positive peak position is less than −0.05 seconds.

12. The method of claim 10, wherein the loop is a long loop when the positive peak position is within the range of times.

13. The method of claim 12, wherein the range of times is between 0.013 and −0.05 seconds.

14. The method of claim 10, wherein the loop is a short or closed loop when negative peak position is less than positive peak position.

15. The method of claim 10, wherein the loop is an open loop when negative peak position is greater than positive peak position.

16. The method of claim 10, wherein the loop is a short open loop when negative peak position is greater than positive peak position.

17. An apparatus for single-ended line testing (SELT) to provision xDSL service, the apparatus comprising:
a processing unit adapted to generate a time-continuous signal;
a transmitter adapted to convert the time-continuous signal to an analog test signal and to transmit the analog test signal through a loop to be tested;
a receiver having an input that receives an echo response signal resulting from the transmission of the analog test signal;
a band-pass filter to reduce near-end echo in time-domain;
a correlator that correlates the transmitted analog test signal and the received echo response signal and generates an echo response function;
a bump compensation filter applied to the echo response function to mitigate undesired bumps;
a match filter applied to the echo response signal and a far-end echo template to obtain a matched echo response;
a time-dependent scaler adapted to scale the matched echo response to compensate for loop attenuation; and
a median filter applied to the scaled echo response to mitigate background noise and enhance peaks for detection;
wherein the processing limit calculates a length of the loop based at least in part on the position of the peaks.

18. The apparatus of claim 17, wherein the bandpass filtering suppresses the high frequency transmitted analog test signal.

19. The apparatus of claim 17, wherein the processor unit includes the bump compensation filter.

20. The apparatus of claim 17, wherein the processor unit includes the match filter.

21. The apparatus of claim 17, wherein a time-dependent echo is measured from the cross-correlation between the transmitted and received signals.

22. The apparatus of claim 17, wherein the time-dependent scaling of the matched echo response is in the form of $10^{\alpha t}$, where $\alpha > 0$.

23. The apparatus of claim 17, wherein median filtering provides modeling of the far-end echo.

24. The apparatus of claim 17, wherein the scaled far end echo is subtracted from the background, leaving peaks that represent the far end echo.

25. The apparatus of claim 17, wherein loop length is determined by the position of both positive and negative peaks.

* * * * *